United States Patent
Hill et al.

(10) Patent No.: US 9,053,482 B2
(45) Date of Patent: Jun. 9, 2015

(54) SERVICE FOR MANAGING DIGITAL CONTENT LICENSES

(75) Inventors: Peter F. Hill, Seattle, WA (US); Andre Vrignaud, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 448 days.

(21) Appl. No.: 13/115,021

(22) Filed: May 24, 2011

(65) Prior Publication Data
US 2012/0303490 A1 Nov. 29, 2012

(51) Int. Cl.
*G06F 21/00* (2013.01)
*G06Q 30/00* (2012.01)
*G06F 21/10* (2013.01)

(52) U.S. Cl.
CPC ............... *G06Q 30/00* (2013.01); *G06F 21/00* (2013.01); *G06F 21/10* (2013.01)

(58) Field of Classification Search
USPC .......................................................... 705/59
See application file for complete search history.

(56) References Cited

U.S. PATENT DOCUMENTS

| | | |
|---|---|---|
| 7,117,167 B2 | 10/2006 | Seal et al. |
| 7,472,077 B2 | 12/2008 | Roseman et al. |
| 7,640,186 B1 | 12/2009 | Fraser et al. |
| 7,870,273 B2 | 1/2011 | Watson et al. |
| 8,052,520 B2 | 11/2011 | Park |
| 8,052,521 B2 | 11/2011 | Webb et al. |
| 2003/0018582 A1 | 1/2003 | Yaacovi |
| 2004/0073515 A1* | 4/2004 | Stefik et al. .................... 705/52 |
| 2004/0111341 A1 | 6/2004 | Aikoh et al. |
| 2004/0193545 A1* | 9/2004 | Shlasky .......................... 705/59 |
| 2005/0071280 A1 | 3/2005 | Irwin et al. |
| 2005/0188424 A1 | 8/2005 | Kizyma |
| 2005/0246193 A1 | 11/2005 | Roever et al. |
| 2006/0010076 A1* | 1/2006 | Cutter et al. .................... 705/63 |
| 2007/0143341 A1 | 6/2007 | Brownell et al. |
| 2008/0228513 A1* | 9/2008 | McMillan et al. ................ 705/1 |
| 2008/0294531 A1 | 11/2008 | Nassimi |

(Continued)

FOREIGN PATENT DOCUMENTS

| | | | |
|---|---|---|---|
| JP | 2004-030326 A | 1/2004 | |
| JP | 2004302835 A | * 10/2004 | ............. G06F 12/14 |

(Continued)

OTHER PUBLICATIONS

International Search Report and Written Opinion for International Application No. PCT/US2012/039201, mailed Jul. 27, 2012.

(Continued)

*Primary Examiner* — James A Reagan
(74) *Attorney, Agent, or Firm* — Knobbe, Martens, Olson & Bear, LLP

(57) ABSTRACT

A content management system may receive, purchase or otherwise obtain licenses from content owners or licensors and provide such content licenses to application developers or other content creators. The content management system can act as a central broker for licensing content rights to developers. The application developers can then generate content items based on the obtained licenses and provide or sell those content items to users of their applications. For instance, the developer may license an automobile design, brand name or performance data from an automobile manufacturer and create an automobile model for a racing game application.

18 Claims, 4 Drawing Sheets

(56) References Cited

U.S. PATENT DOCUMENTS

| | | |
|---|---|---|
| 2009/0029754 A1 | 1/2009 | Slocum et al. |
| 2009/0055288 A1 | 2/2009 | Nassimi |
| 2009/0106847 A1 | 4/2009 | Krupman et al. |
| 2009/0325685 A1 | 12/2009 | Webb et al. |
| 2010/0016499 A1 | 1/2010 | Oshima |
| 2010/0161499 A1 | 6/2010 | Oshima |
| 2010/0235261 A1* | 9/2010 | Lloyd et al. .............. 705/27 |
| 2011/0045816 A1 | 2/2011 | Wang et al. |
| 2011/0060660 A1 | 3/2011 | Bhambri et al. |
| 2011/0231273 A1 | 9/2011 | Buchheit |
| 2011/0246294 A1 | 10/2011 | Robb et al. |

FOREIGN PATENT DOCUMENTS

| | | |
|---|---|---|
| JP | 2006-178547 A | 7/2006 |
| JP | 2007-109239 A | 4/2007 |

OTHER PUBLICATIONS

English translation of Office Action for Japanese application No. 2014-512085, drafted Dec. 1, 2014, 4 pages.

U.S. Appl. No. 13/115,047, filed May 24, 2011, Hill et al.

\* cited by examiner

SERVICE FOR MANAGING DIGITAL CONTENT LICENSES

BACKGROUND

The growth of the Internet has made digital distribution of content more desirable. The lower costs of digital distribution over a computer network versus distribution using physical media can only be expected to further drive the growth of the digital distribution channel. A growing number of content types such as applications, games, music, books and movies are now available through digital downloads, including mobile applications for wireless devices (sometimes called "apps").

With the growth of digital content, content developers are able to distribute content items at relatively low cost. This has resulted in the growth of the market for digital content items. In addition, the increase in digital content items has created a need for managing rights for digital items, such as Digital Rights Management (DRM) systems. With the proliferation of digital content items, managing, tracking and transferring rights to such content items have become more difficult.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the invention.

DETAILED DESCRIPTION OF SPECIFIC EMBODIMENTS

I. Introduction

Figure 1:
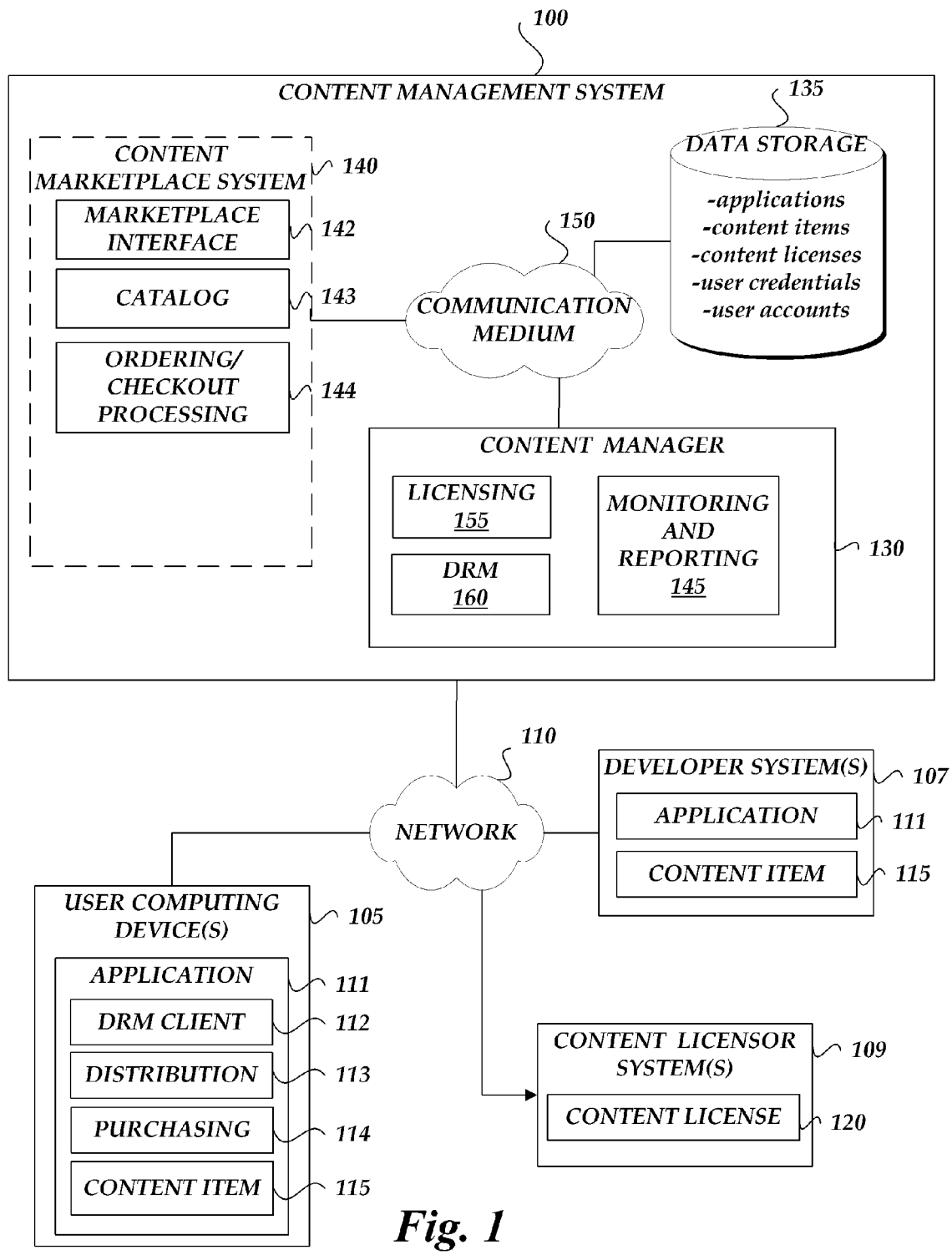
FIG. 1 is a network diagram schematically illustrating an example of a content management system that manages transfers of content items and associated content item entitlements.

Many applications, such as games, allow users to purchase content items or other additions to the application, such as game maps, game items, characters, UI themes, music, levels, additional functionality, etc. These content items can be purchased from digital content stores or content marketplaces and can then be utilized within the application. However, typically, the content items are tied by Digital Rights Management (DRM) systems to a particular user computing device or user account associated with the purchasing user and cannot be used except on the same user computing device or by the same user account. As a result, the content items cannot be resold or traded to another user. Thus, if the purchasing user grows tired of the content item, the user cannot resell or trade the content item.

This disclosure describes systems and associated processes that provide a solution to the above problem. In certain embodiments, these system and processes can advantageously couple DRM protection of content items with digital content stores in order to allow content items to be transferred from one user computing system to another computing system. For instance, these systems and processes can be implemented in the context of an application store or content management system that distributes applications for purchase or for free to user devices. Developers can submit applications to the content management system for distribution to end users. In response to receiving an application from a developer, the content management system can generate application-specific digital stores that allow end users to conduct transactions with other end users to sell, trade and/or buy content items associated with the application. In response to a sale or trade, DRM protections associated with the content items can allow a content item to be removed (e.g., deleted or disabled) on one user computing device and provided to another computing device, while maintaining the same number of outstanding active copies of the content item before and after the sales transaction between users. The DRM protection associated with the content items may also prevent or otherwise reduce copying or modifying of the application.

In an embodiment, the content management system may receive, purchase or otherwise obtain licenses from content owners or licensors and provide such content licenses to application developers or other content creators. The content management system can act as a central broker for licensing content rights to developers. The application developers can then generate content items based on the obtained licenses and provide or sell those content items to users of their applications. For instance, the developer may license an automobile design, brand name or performance data from an automobile manufacturer and create an automobile model for a racing game application. These and other features are described in greater detail below with respect to the figures.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims.

II. Content Management System Overview

FIG. 1 is a network diagram schematically illustrating an example of a content management system 100 that manages transfers of content items and associated content item entitlements. The content management system 100 may also provide application-specific content marketplaces for trading or selling content items associated with a particular application and may be operated by a content management service provider. The content management system 100 may also obtain content licenses from content licensors or content owners (hereinafter "content licensors"), bundle content licenses, provide licenses to developers and/or split revenues from content items associated with the licenses with the developers and content licensors. For ease of explanation, the following disclosure uses the term "developers" to refer to content creators, application developers, application publishers, or other entities involved with creating and providing applications and application content items to end users. The term "license" is used herein to refer somewhat interchangeably to (1) a legal right or authorization that is or can be granted, and (2) a computer representation of that legal right or authorization. Depending upon the context of its use, the term may refer more specifically to one of these two items.

The content management system 100 can include any system capable of receiving the applications and application content items from developers and providing the applications and application content items to users. The applications and application content items can be made available via download, streaming, application virtualization, or the like. This can include, for example, making the application available for a one-time cost, for a subscription, or for free. Further, this can include, for example, making the application available to any number of users, to a predetermined number of users, to a predetermined set of users, for a limited time, for a limited number of uses, or indefinitely.

In FIG. 1, the content management system 100 is in communication with user computing devices 105, developer systems 107 and/or content licensor systems 109 over a communication network 110. The network 110 may, for example, be a publicly accessible network of linked networks, possibly operated by various distinct parties, such as the Internet. In other embodiments, the network 110 may be a private network, such as, for example, a corporate or university network that is wholly or partially inaccessible to non-privileged users. In still other embodiments, the network 110 may include one or more private networks with access to and/or from the Internet.

Developers, using their computing systems 107, can develop applications and submit those applications to the content management system 100 to have that content item made available for purchase and/or download by customers for their customer devices 105, such as tablets, smart phones, e-book readers, non-mobile computers, and other types of computing devices 105. The devices 105 can generally include any computing device(s), such as wireless mobile devices (such as smart phones, PDAs, tablets, or the like), desktops, laptops, video game platforms, television set-top boxes, televisions (e.g., internet TVs), and computerized appliances, to name a few. Further, it is possible for the devices 105 to be different types of devices, to include different applications, or to otherwise be configured differently. In addition, the devices 105, 107 can include any type of operating system ("OS"). For example, the computing devices 105 can implement an Android™ OS, a Windows® OS, a Mac® OS, a Linux or Unix-based OS, or the like.

After receiving the content submission from the developer, the content management system 100 can list an application or application content item with the content marketplace system 140 or with a third-party marketplace. Typically, the content marketplace system 140 and third-party marketplaces are operated by different business entities, though a single business entity may operate more than one content marketplace. For example, the third-party marketplaces may operate on computing systems comprising one or more computing devices, the computing systems operated by different business entities, the computing systems in communication with the content management system 100 via the network 110.

In some embodiments, the content submission from the developer may include access credentials (e.g., keys, tokens, usernames, account names, passwords, etc.) for submitting the content to the content marketplace system 140 or verifying the source of the content submission. The access credentials may be stored in an account of the content management system associated with the user or may be matched with already-stored access credentials in the account. In some embodiments, the content submission is digitally signed with a public key certificate or other electronic certificate in order to verify that the content submission came from a particular user.

After the content management system 100 receives the content submission request from the user, the content management system 100 stores content submission data, such as the application(s), application content item(s) or content metadata, on data storage 135 (e.g., database, flat file or data structure on a storage device such as a file server, hard drive, optical drive, etc.) of the content management system 100. The data storage 135 may also store user credentials related to user accounts. For example, the content management system 100 may check access credentials received with the content submission to determine whether the user submitting the content has access rights to an account maintained by the content management system. If access rights are verified, the content management system 100 can then update content submissions and other data associated with the account.

Typically, the content management system 100 manages or coordinates the distribution of applications and application content items. Many applications allow users of those applications to obtain additional or "add-on" application content items distinct from the application itself. These application content items may be purchased or obtained from within an application (e.g., in-app purchase) or may be purchased through interfaces provided by the content management system 100 (e.g. web services or device-installed marketplace app). For example, such application content items can include game maps, game levels, game saves, game items, game characters, game data, videos, images, music, designs, avatars, characters, descriptions, guides, hints, news, e-books, other written messages or content or the like. These content items can be utilized within the applications associated with the content items. In one example, a user using an e-reader device or other computing device having an e-reader application can purchase an electronic book within the e-reader application for reading on the device.

Referring to FIG. 1, the user computing devices 105 run one or more applications, such as application 111, that include functionality for interacting with the content management system 100 (as described below). The application 111 may, for example, be a game, navigation app, social networking app, business app, productivity app, utility app, media app, entertainment app or the like.

In some embodiments, the content management system 100 or a related entity may provide a software development kit ("SDK") for creating such applications. Applications 111 created with the SDK may automatically or by default include certain code modules, such as a DRM client module 112 or a distribution service module 113, to provide certain functionality without requiring developers to implement the functionality themselves. For example, the DRM client module 112 can track entitlement rights for content items 115 on the user device computing device 105 for the content management system 100, control access to content items on the user computing device 105, and/or remove expired or transferred content items from the computing device 105. The distribution service module 113 can obtain content items from the content management system 100, for example, through download. In some embodiments, the application 111 may also include a purchasing module 114 that allows purchasing of application content items 115 from within the application. The purchasing module 114 may communicate with a content marketplace system 140 to provide a list of available content items 115. In some embodiments, the functionality implement by the modules may be implemented by an application store client and not on developer applications.

The application 111 and associated application content items 115 may be developed or created on the developer systems 107 associated with respective developers. Developers, using the SDK, can generate the application 111 and content items associated with the application. The developers can then submit or upload the application and content items with the content management system 100 for inclusion in the content marketplace system 140. In some embodiments, developers may use an integrated development environment, a source code editor or the like, in addition to, or as alternative to using the SDK to develop the application.

In some situations, the application content items 115 may include intellectual property (IP) owned by another party. For example, the content items 115 may incorporate designs, brands, specifications, or other data protected by trademark, copyright or other IP protection. To simplify or otherwise facilitate the development process, the content management system 100 may act as a centralized broker for the licensing of such intellectual property. The content management system 100 may obtain licenses from a plurality of content licensors or computing systems associated with the content licensors 109 and provide those content licenses 120 to developers desiring to create content items based on those licenses. Such content items can include sport event scores and data, sport player statistics, vehicle designs, weapon designs, character designs, brand names or marks or the like.

In some embodiments, the content management system 100 acts as a broker for content licenses 120 between developers and content licensors. By acting as a central broker, the content management system 100 can potentially simplify the licensing process for content developers by automating (partially or wholly) the licensing process. In addition, the content management system 100 may enforce content licenses by monitoring, tracking, and/or managing the content licenses. For example, if the content management system 100 receives a content item from a developer, it can determine if a content license covers the content item and whether the content item is compliant with the content license.

In some embodiments, the content management system 100 may create license bundles of content licenses from multiple content licensors and provide the bundles to developers. Such bundles can be grouped by subject matter, popularity, or other commonality. For example, the content management system 100 can create license bundles such as 10-best sports cars, top 5 trucks, special forces weapons pack, sports teams packs (e.g., current or historical), other vehicle packs, character packs, item packs, or the like. Developers who license the bundles can then create licensed content items which can be used in different types of applications and for different uses. However, in some embodiments, uses or amounts of the licensed content items may be specified and/or limited by the content licenses.

The license bundles can include content licenses 120 from multiple content licensors, thus allowing developers to license content items 115 for their application without necessarily negotiating with multiple parties. In some embodiments, the content management system 100 may allow developers to create their own license bundles. Content licenses may also be licensed individually by the developers. The content management system 100 can provide a "one-stop shop" for developers to obtain licenses, thereby simplifying or otherwise facilitating the content licensing process. The content management system 100 may track content licenses associated with developers, verify developer compliance with the licenses, collect license fees, and/or split revenues from content item purchases. In some embodiments, the developers may pay a fee for use of the license, split revenues with the content licensor or a combination of the above. The content management system 100 may charge fees to the content licensor or developer or take a split of revenues for its services.

III. Example Scenarios

In one example, the content management system 100 may obtain licenses 120 for superhero characters from multiple comic publishers. The content management system 100 may then generate license bundles for groups of characters (e.g., golden age heroes, X-MEN, flying heroes, alien heroes, etc.) that developers can license. Developers can then use the characters in their applications, such as a role-playing game, fighting game, strategy game, puzzle game or the like.

In another example scenario, the content management system 100 can obtain licenses to team names from baseball teams and game data from the baseball league. The content management system 100 may then group or bundle the licenses, such as creating a bundle corresponding to a current baseball team or a historical baseball team. The content management system 100 can then provide the license bundle to developers or other content creators, who can then use the license bundle in a variety of ways and in a variety of applications.

In another example scenario, the content management system 100 provides or generates an application-specific digital store for a fantasy baseball application. Users of the application can trade or sell players to one another. In one embodiment, multiple application-specific digital stores may be created for the fantasy baseball application so that end users may compete in leagues or be otherwise grouped together. DRM protection can be applied to baseball player content items in order to keep baseball players unique to a particular application-specific digital store, with only one end user associated with the application-specific digital store able to own a particular player at one time. The content management system can track ownership of players and manage transfers of baseball players from one user to another, thereby allowing end users to bid for, sell, trade or buy baseball players.

IV. Content Management System Details

In FIG. 1, the content management system 100 comprises a content manager 130, data storage 135 and, optionally, a content marketplace system 140 in communication via a communication medium 150, such as network. The content marketplace 140 may be operated by the content management service provider or by another entity.

Typically, the data storage 135 stores the applications and content items associated with respective applications. A requesting computing device 105 can download applications and content items from the content management system 100. The application data may include images, binaries, videos, and/or other electronic data, and may be grouped as a content bundle comprising a single content file or stream, a compressed file (e.g., ZIP, RAR, or other compressed file format) or multiple files. Typically, the content data is stored and/or transmitted as electronic files, though the content data may also be transmitted as one or more data streams. The data storage 135 may also store content metadata describing the content data. In some embodiments, the content metadata comprises content file titles, descriptions, key words, content price, versioning information and/or the like. The content metadata may be provided by the content marketplace system 140 on its catalog 143 and associated with respective content data.

The content management system 100 may be associated with a particular content marketplace system 140 or digital store. For example, the content management system 100 and content marketplace system 140 may be operated by the same business entity or related business entities. Among other functions, the content marketplace system 140 may store or provide content items/products (e.g., applications, e-books, etc.) submitted by publishers, authors, developers and/or other professional content creators, and make these items available to customers. The content marketplace system 140 can also provide application content items associated with respective developer applications for sale or download.

The content marketplace system 140 can be a server system that hosts a web site, or that hosts another type of interactive system for enabling users to browse and make purchases from a catalog. Referring to FIG. 1, the content marketplace system 140 comprises a marketplace interface 142, an electronic catalog 143 of content items and an ordering and/or checkout processing module 144 (hereinafter "order/checkout module 144"). The above components of the content marketplace system 140 may operate on the same computing devices or on separate computing devices.

The marketplace interface 142 can provide user computing devices 105 with access to the content marketplace system's catalog 143. The marketplace interface 142 may comprise a network application interface (e.g., a web server), an Application Programming Interface, or other type of interface. In one embodiment, an application store client operating on the user computing device 105 is in communication with the marketplace interface 142 in order provide the user computing device 105 access to the catalog 143.

The catalog 143 can include content items available for purchase, such as applications and content items associated with respective applications. The catalog 143 may also include content item metadata that describes the content items.

The electronic catalog 143 can provide functionality for customers to locate, download, and, where applicable, pay for applications and application content items of interest. The electronic catalog may be accessible via a web site, an "app store" application that runs on mobile devices of users, and/or other types of interactive systems. Typically, the electronic catalog includes a separate detail page for each application. The detail page for a given application may, for example, include a description provided by the item's creator, price information, information about the item's creator, customer reviews, device compatibility information, screen shots (where applicable), and other types of information that may be useful to customers. In some embodiments, the detail page can include a list of available application content items associated with the given application. In some embodiments, the list may be filtered or generated based on settings or information associated with a user account. The content list may also be filtered using a variety of criteria, such as ratings, price, popularity or availability.

The order/checkout module 144 can receive and/or process customer orders for content items. In one embodiment, the order/checkout module 144 may receive customer orders, for example via the marketplace interface 142, process the order, bill or accept payment from the user for the order, credit a seller or developer for the purchase, split payments between different parties, and/or arrange for distribution of the content item. The order/checkout module 144 may perform other functions related to order processing. In some embodiments, the order/checkout module 144 may split fees received from end users (e.g., purchase fees or content delivery fees) with the accounts of developers, content licensors, and/or the operator of the content management system 100.

In FIG. 1, the content manager 130 comprises a monitoring and reporting module 145, a licensing module 155, and a DRM module 160. Each such module may, for example, be implemented by program code executed by computer hardware, or by application-specific hardware. The content manager 130 may also provide a submission interface for developers and content licensors to submit applications, application content items, and/or content licenses. A submission can be received directly from a user (e.g., via an interactive console or other GUI provided by the program execution service), from a program that interacts with the content manager via an Application Programming Interface ("API") (e.g., an API that uses Web services), from the content marketplace system 140 and so forth.

In some embodiments, the monitoring and reporting module 145 monitors content item purchases, transfers of content items, usage of content licenses, prices paid, frequency of purchases, other purchase data or the like, in accordance with the customers' privacy rights. In some embodiments, such data may be anonymized in order to protect customers' privacy. The content management system 100 may data mine the collected data to generate one or more reports associated with the content management service, identify trends in purchases, determine popular items, determine user preferences, generate recommendations for other products, identify cross-marketing opportunities, identify cross-selling or related products, determine pricing information (e.g., market price, price ranges for content items or types of content items, demand at particular price points, etc.), of content items based on resale prices of the content items or perform other analysis on the data.

The monitoring and reporting module 145 can report information and statistics to end users, developers, content licensors or personnel (e.g., administrators) of the content management system 100. For example, the monitoring and reporting module 145 may track content submission histories, content sales, versioning data for submitted content, purchase data, or the like. In some such embodiments, the monitoring and reporting module 145 may provide interactive feedback to the user including, for example, current status of a purchase, time till completion of a download, etc. In some embodiments, the monitoring and reporting module 145 can generate a report detailing or summarizing the purchase data and communicate the report to users via electronic mail or provide access to the report, usage statistics, or interactive feedback via Web services.

The licensing module 155 can monitor and track content licenses 120 from content licensors. The licensing module 155 may also track conditions associated with content licenses 120 and determine if the conditions are being fulfilled by a licensees. For example, the licensing module 155 may determine if the number of content items generated by a licensee exceeds a quota, maximum amount, or threshold specified by the content license. In another example, the content license may prohibit reselling of content items, limit the applications in which the content items may be used, or otherwise prohibit particular uses of the content items associated with the content license.

In some embodiments, the licensing module 155 generates report(s) that indicate whether the number of content items exceeds the quota, maximum amount, or threshold specified by the content license or whether the licensee is otherwise non-compliant with the content license. The licensing module 155 may transmit such reports to the content licensor or otherwise notify the content licensor to violations of the content license.

The licensing module 155 may also determine license fees or other payments due to the content licensor. The licensing module 155 may arrange for purchase payments (or other payments) to be divided between at least the content licensor and the developer, for example, by accessing and/or crediting accounts associated with the content licensor and developer with portions of the purchase payments. The licensing module 155 may also determine how to apportion the payments between developers and content licensors. For example, a content license may specify that a certain percentage of proceeds from sales of content items be given to the content licensor and the licensing module 155 can calculate the percentage of the payment due to the content licensor.

The DRM module 160 can generate or validate authorization or security tokens (or other authentication data) for managing content items. The security tokens can be used to control usage of the content items or manage transfer of the content items. For example, the security tokens can include computing device identifiers or other parameters that uniquely identify user computing devices 105. The security token created by the DRM module 214 can be associated with the content item 115. The security token can be created to include a checksum of the content item and information relating to the user who purchases the content item from the content management system 100. For example, the security token can include a user identifier and a device identifier, to name a couple. Some events, such as transfer of the associated content item to another user computing device 105 can cause the content management system 100 to update the security token.

In some embodiments, the security or authorization token can provide additional functionality. For example, the security token may include an expiration parameter. The expiration parameter or field can be used to end usage of a content item. For example, a token associated with a baseball player content item may be valid only for a particular season (e.g., the 2011 season). In another example, the security token can include a parameter identifying an associated content license. This content license parameter can allow the content management system 100 to determine the total number of content items generated under a particular content license, and to thereby monitor compliance with the content license. In one embodiment, analyzing the security token can include determining that the content management system 100 created the security token or that the security token is unexpired or otherwise valid (e.g. when receiving a request to validate a token from a source computing device). In one embodiment, analyzing the security token can include creating a checksum of the content item and comparing the checksum to one included with the security token. In one embodiment, the security token is a JavaScript Object Notation (JSON) (or other data schema), compressed using zlib (or other data compression software), encrypted using a private asymmetric key known by the content management system 100, and encoded in Base 64 format (or other encoding format).

The security token may also include parameters specifying the situations in which the content item associated with the token may be used. In some embodiments, the security token includes a time limit specifying how long the security token is valid; in such embodiments, the content management system 100 authenticates the token only if the time limit has not passed or if a timestamp of the security token is within the time limit or within a threshold time range (e.g., within 30 minutes of purchase, 1 hour, 1 day, etc). In some embodiments, the security token is a one-time use token, and the content management system 100 authenticates the token only if the token has not already been used.

In creating the checksum, digital certificate(s) associated with the application developers and/or the content management system 100 can be included with or applied to the checksum. Further, in creating a security token, a certificate can be used to sign the security token; this provides a level of assurance that the security token has not been modified by an entity other than the entity that created the security token. Generally, a digital certificate identifies a user or an organization and provides a level of assurance that the user or the organization is who he/she/it claims to be. This level of assurance is associated with the trust placed in the certificate authority that issues the certificate. The certificate typically includes, among possibly other things, a public key associated with the certificate owner's private key and an issuer that identifies an entity (e.g., the certificate authority) that verified the certificate owner. Non-limiting examples of certificate provider systems or certificate authorities include VeriSign™, GoDaddy™, and Comodo™. Generally, these certificate provider systems are the certificate issuers identified with the digital certificate. The certificate may be stored in the data storage 135 or other system capable of storing certificates.

In response to the user's purchasing a digital content item, the content management system 100 can provide the digital content item along with the security token to the purchasing user computing device 105. The DRM client module 112 on the user computing device 105 can use the security token to determine whether to provide access to the content item on the user computing device 105. In the event of a resale of the content item, the content management system 100 can cause the security token to expire in order to prevent further access to the content item or the content management system 100 can cause the content item to be disabled or deleted, for example, by communicating the DRM client module 112 and issuing a command to remove the content item.

In some embodiments, the content management system 100 maintains accounts for its users. The content management system may maintain different types of accounts for different types of users (e.g., developers, customers and content licensors) or the accounts may be the same type. In one embodiment, the account of a developer can include information about the developer's applications and content items, such as the price of the content, description of the content, current version of the content or other account information. This data can be updated based at least partly on content submissions sent by the developer. For example, if a developer wants to publish a new version a content item, the developer can register the new content item. The content management system can then update the information associated with that content item. Customer accounts may include information about content purchases, credit card or payment information, account balance, shipping options, address, user computing device information (e.g., unique device identifier, device model, device specifications, operation system, IP address, port address, network address), or the like. In some embodiments (e.g., where the content management system 100 is associated with a content marketplace system 140), the content management system 100 may maintain or have access to accounts of content marketplace system 140 customers. In some embodiments, the accounts of the content management system 100 and the content marketplace system 140 are the same.

In some embodiments, the content management system 100 may be configured differently than illustrated in FIG. 1. For example, various functionalities provided by the illustrated modules can be combined, rearranged, added, or deleted. In some embodiments, additional or different processors or modules may perform some or all of the functionalities described with reference to the example embodiment illustrated in FIG. 1. Many implementation variations are possible.

Figure 2:
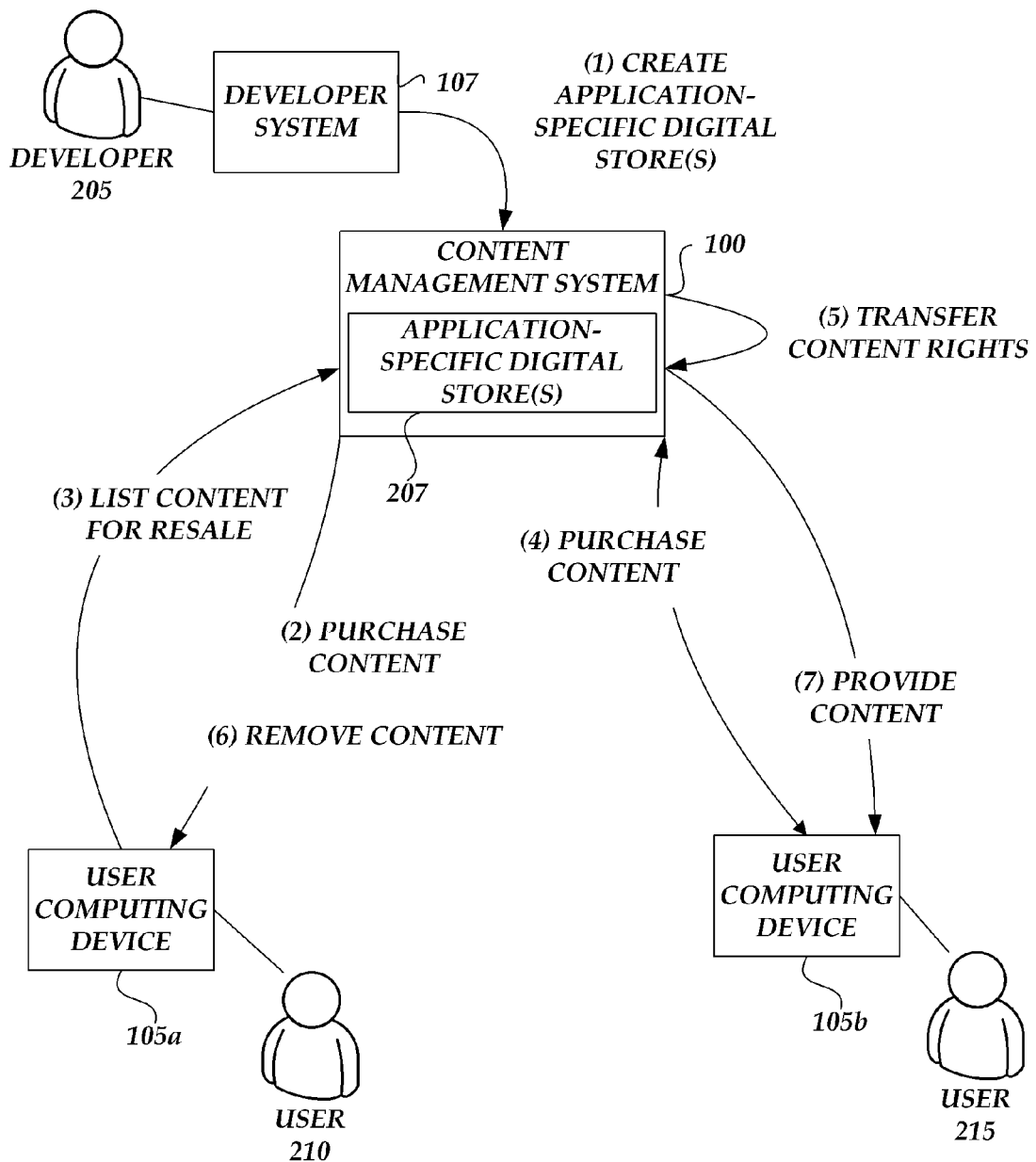
FIG. 2 is a flow diagram that schematically illustrates an example embodiment of a content item resale process managed by the content management system.

FIG. 2 is a flow diagram that schematically illustrates an example embodiment of a content item resale process managed by the content management system 100. The example process is intended to illustrate, but not to limit, various aspects of the content management system 100. FIG. 2 illustratively shows the user computing devices 105a, 105b interacting with the content management system 100. The interactions may be via an API (e.g., request API or reporting API) or other type of interface (e.g., web services interface). The content management system 100 can receive requests for the system's content management services from other user computing systems, for example, via the API and can communicate confirmations to the other user computing systems via the API (such requests and confirmations are not shown in the illustrative example in FIG. 2). Different types of programmatic interactions (additionally or alternatively) between the content management system 100 and the user computing devices 105 are possible. For example, a request can be received directly from a user (e.g., via an interactive console or other GUI provided by the program execution service) or from an executing program of a user that automatically initiates the execution of other programs.

In event 1 of FIG. 2, a developer system 107 or developer 205 associated with the system requests that the content management system 100 create application-specific digital store(s) 207 for content items for a given application developed by the developer 205. In response to the request, the content management system 100 creates such digital store(s). In some embodiments, the application-specific digital store 207 may be created automatically by the content management system 100, for example, after receiving an application submission from a developer.

An application-specific digital store 207 may be distinct or separate from the application associated with the digital store. Thus, the digital store 207 does not need to be created by the developer 205 as part of the application. Rather, the digital store 207 may be dynamically created by the content management system 100, thereby allowing digital stores to be created as needed. For example, referring back to the baseball fantasy baseball example, additional digital stores 207 may be created if additional end users begin using the application, thereby allowing additional groups or leagues to be created, as needed. In another example, a digital store 207 may be created for a particular period of time, such as a sports season, with a new digital store 207 with updated content items (e.g., sports player content items) generated at the beginning of the next season. This can allow application content items to be updated without requiring changes to the application itself.

In some embodiments, the application-specific digital stores 207 may be part of the content marketplace system 140. For example, the digital stores 207 may be a set of detail pages or content items in the catalog 143 associated with the given application. The digital store 207 may be accessible directly through the given application or may be accessible as a web service using a web browser. In one embodiment, a user of the given application uses the application-specific digital store 207 to view or purchase content items associated with the given application or buy, sell or trade content items with other application users.

Depending on the particular application, there may be one or more digital stores 207 created. For example, a fantasy baseball application may require multiple digital stores 207 corresponding to different leagues or groups of users. In some embodiments, content items are unique to or of limited number in each application-specific digital store. For example, a given baseball player may be unique to a particular user group, wherein only a single user in the group can draft the given baseball player.

At event 2 of FIG. 2, a user 210 or user computing device 105 purchases a content item from an electronic catalog from a content marketplace system 140 or an application-specific digital store 207. The catalog may be viewed within an application 111 associated with the content item or from a separate program, such as a web browser or application marketplace (e.g., an "app store") or other application configured to provide or list items from the electronic catalog 143 to the user.

The user 205 may purchase the content items from the catalog using the computing device 105. A user account associated with the user 210 and/or user computing device 105a may be charged for the purchase, for example, by a content marketplace system 140 that hosts or otherwise provides the electronic catalog 143.

In event 3 of FIG. 2, the user 210 or user computing device 105a requests the content item to be listed for resale by the content management system 100. For example, if the user gets tired of the content item or otherwise no longer wants it, then the user 210 can resell or trade the content item on the application specific digital store 207. In some embodiments, the developer 205 may be incentivized to allow resale of content items by receiving a portion of the payment received during a resale of the content item. The payment may be a flat fee or a percentage of the sale.

In some embodiments, the content management system 100 may validate the content item listed for sale. Such validation can include checking that the user 210 actually owns the content item, that the content item is unexpired or other validation procedures. In one embodiment, validation is performed by examining the security token associated with the content item.

In event 4 of FIG. 2, a second user 215 purchases the content item through the content management system 100. The content management system 100 can bill the second user 215 for the purchase price of the content item and then provide the payment to the user 210 or credit an account of the user 210. The content management system 100 may receive a portion of the payment as a fee. The content management system 100 may also provide a portion of the payment to the developer 205 or the developer's account.

In event 5 of FIG. 2, the content management system 100 transfers content rights for the content item between from the first user 210 to the second user 215. In one embodiment, content rights may be managed by the DRM module 160 or another component of the content management system 100. In one embodiment, the transfer is accomplished by updating a security token (or other data structure) of the content management system 100 as described above. For example, the security token associated with the content item may be updated or re-generated to reflect the transfer to the second user computing device 105b associated with the second user 215.

In event 6 of FIG. 2, the content management system 100 removes the content item from the user computing device 105a. The content item may be removed by deletion or by disabling the content item. For example, the content management system 100 may cause a security token stored on the user computing device 105a to expire, thereby preventing the content item from being used on the computing device.

In event 7 of FIG. 2, the content management system 100 provides the content item to the user computing device 105b. The content item may be downloaded to the device 105b. The download may be accomplished using any suitable network protocol for transferring data across networks. In some embodiments, the content item is accompanied by a security token that authorizes the user computing device 105b to utilize the content item. For example, a DRM client module 112 on the computing device 105b may check the validity of the token before allowing an application 111 on the device to utilize the content item.

Figure 3:
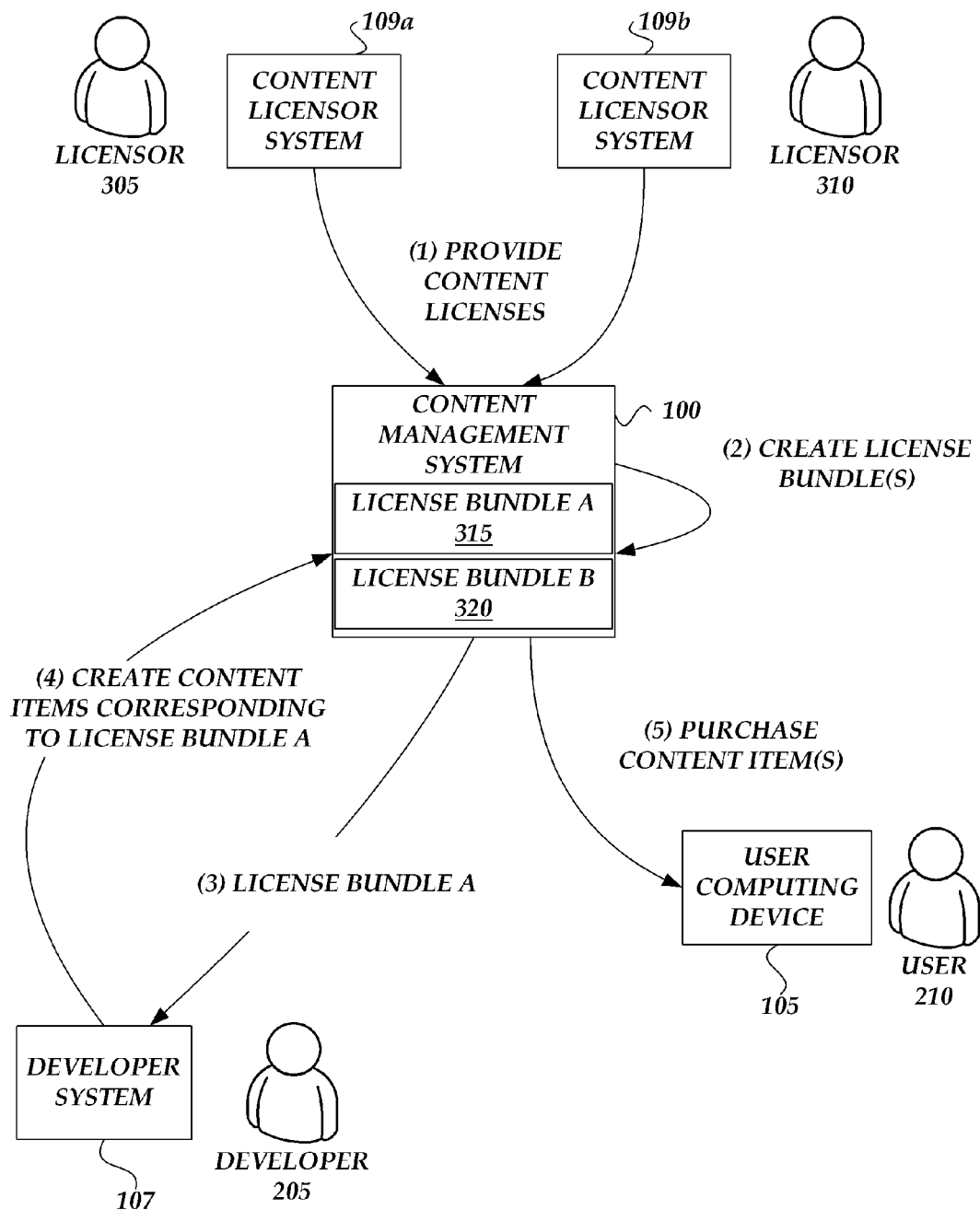
FIG. 3 is a flow diagram that schematically illustrates an example embodiment of a content license acquisition process managed by the content management system.

FIG. 3 is a flow diagram that schematically illustrates an example embodiment of a content license acquisition process managed by the content management system 100. FIG. 3 illustratively shows developers 205 obtaining content licenses from content licensors 305, 310 via the content management system 100. Interactions between the developer systems 107, content licensor systems 109a, 109b and content management system 100 may be via an API (e.g., request API or reporting API) or other type of interface (e.g., web services interface). Different types of programmatic interactions (additionally or alternatively) between the content management system 100 and the developer systems 107 and content licensor systems 109a, 109b are possible. For example, a request can be received directly from a developer (e.g., via an interactive console or other GUI provided by the program execution service) or from an executing program on the developer system 107.

In event 1 of FIG. 3, a plurality of content licensor systems 109a, 109b or licensors 305, 310 associated with the systems provide content licenses to the content management system 100. Data representing the content licenses may be stored by the content management system 100. For example, the content licenses may be represented as content license objects or data structures that contain information about the content license, such as limitations, maximum amount of content items creatable, allowed or disallowed uses, royalties or other terms. The content management system 100 may purchase the content licenses from the licensor systems and sublicense the content licenses to developers or provide the content licenses on behalf of the licensors as a service. Such licensing by the content management system may involve communicating with the developer systems 107 to execute licensing transactions.

In event 2 of FIG. 3, the content management system 100 creates license bundle(s) 315, 320. The license bundles may be created by combining content licenses from two or more licensors 305, 310. The licenses may be grouped based on common subject matter. For example, the license bundles may be for characters, automobile designs, sports data or the like. By combining license bundles, the content management system 100 simplifies the content licensing process for developers.

In some embodiments, the license bundles are created based on selections from developers. For example, the developer may select content licenses that it is interested in. In some embodiments, content licenses may be selected individually.

In event 3 of FIG. 3, the developer 205 selects a license bundle from a plurality of license bundles. In FIG. 3, the developer selects licenses bundle A 315. The license bundle may include terms or parameters of use. For example, the license bundle 320 may specify a maximum number of content items created under the license. It can also specify the type or number of applications in which the content items may be used. Other terms may also be specified by the license, such as whether content items may be resold between users.

In event 4 of FIG. 3, the developer 205 generates content items corresponding to the license bundle A. The content items may be used for any application of the developer. The content items can be listed on a content marketplace system 140 and provided to users for purchase.

In some embodiments, the content management system 100 determines whether the content items created by the developer 205 are in compliance with the terms of the license bundle 315. For example, the content management system 100 may determine if any limits specified by the license bundle 315 are exceeded.

In event 5 of FIG. 3, a user 210 purchases content item(s) provided by the developer 205. The content management system 100 provides the content item to the user computing device 105 associated with the user 210. In some embodiments, the content management system 100 splits the purchase payment from the user 210 between the developer 205 and the licensors 305, 310. The content management system 100 may also receive a portion of the payment for the services it provides.

Figure 4:
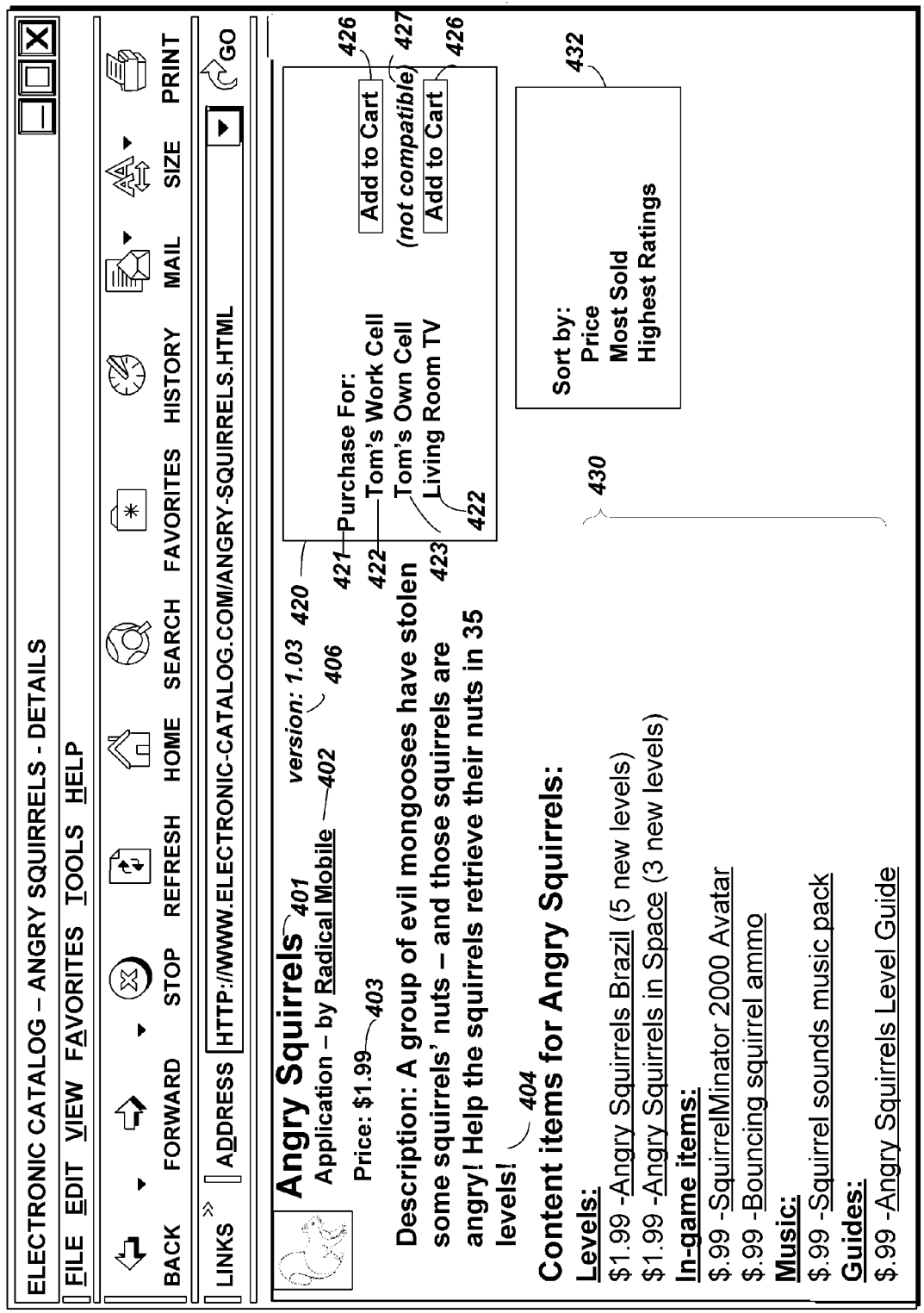
FIG. 4 illustrates an example of a user interface in which the user receives information about application content items available for an application offered by a content marketplace system.

FIG. 4 illustrates an example of a user interface in which the user receives information about application content items available for an application 111 offered by a content marketplace system 140. In this embodiment, the user interface is a product detail page, such as a web page or other network resource, provided by the content marketplace system's catalog interface 142. The illustrated detail page describes a particular (fictitious) mobile application, Angry Squirrels 401. The detail page may provide a variety of information or application metadata about the application, including a detailed description 404, the application's current version number 405, its developer 402 and its price 403. The detail page also includes personalized compatibility information 420. In one embodiment, the content marketplace system 140 maintains user data which associates users with mobile devices or other computing devices. A user may access the content marketplace system 140 through a user computing device 105, for example by going to a network-accessible page and providing login information associated with the user's account. Alternately or additionally, the system may recognize the user's mobile device 103 by a browser cookie or key transmitted by the user computing device 105. The system may provide users with the ability to create new accounts, modify account information, or make purchases through network resources (e.g., web pages) provided to user systems, and/or through an application store client on the user computing device 105.

In the example of FIG. 4, the system presents the user with the option to purchase the application or application content items, for either of the user's compatible devices by adding the content item to the user's cart 426. In one embodiment, the content item may be purchased for a particular mobile device, reflected by the separate "Add to Cart" buttons 426 for the user's two compatible mobile devices 421, 423. In other embodiments, the content item may be purchased and licensed such that a user may purchase a content item once and use the content item on all of the user's compatible devices. It will be understood that the term "purchase" is used to encompass scenarios in which a user pays to download and/or license a content item but does not take any ownership interest in the content item. In some embodiments, an application's developer and/or publisher, or the user-generated content's creator, may specify whether a content item can be purchased on a per-account versus a per-device basis. In another embodiment, a user may be presented with the ability to obtain an updated version of a content item previously obtained through the content marketplace system 140. Alternately or additionally, updated versions may be obtained on the user computing device 105 directly, such as through an update service component of an application store client.

FIG. 4 shows an embodiment including a listing of application content items 430 associated with the Angry Squirrels 401 application. The application content item listing can include metadata about the user-generated content such as price, name, description, author, or the like. In some embodiments, the user can select a content listing and receive additional information about the content. In the illustrated embodiment, the system presents the user with content items 430 specific to the particular application 111 being viewed by the user. In some embodiments, the application content items 430 may be provided on one or more detail pages that are separate from the application's detail page. The system may provide filtering services 432 for filtering the user-generated content based on a combination of selectable or automated factors, such as device compatibility, user browse history, user purchase history, currently viewed item, applications on the user's mobile devices, contact list, content popularity, content sales, content ratings, or any combination thereof.

In some embodiments, the illustrative detail page view of FIG. 4 may be provided in a digital store associated with a specific application. In one embodiment, the detail page may be directly reached from within the specific application. In some embodiments, the detail page may be accessible only by users associated with the specific application or only by computing devices operating copies of the specific application. For example, users that do not own the angry squirrels 401 application may not be provided access to the angry squirrels detail page.

Other types of programmatic interactions (additionally or alternatively) between the content management system 100, the user computing devices 105 developer systems 107 and content licensor systems 109 are possible in addition to those described above. For example, a request can be received directly from a user (e.g., via an interactive console or other GUI provided by the content management system) or from an executing program on a user computing device 105. In some embodiments, users may interact with the content management system 100 using other types of interfaces and in other ways. For example, the content management system 100 may provide a web services interface (e.g., a web page or set of web pages) that allows a user to submit a request using a web browser. Other types of interfaces may also be used.

The content management system 100 provides a variety of functionality and can comprise any system for managing content submissions and content items transfers between multiple users. The content management system 100, including the content management system 100 and the content marketplace system 140, may be implemented by an appropriate combination of computer hardware and executable code. For example, the content management system 100 may be implemented as a computing system that comprises one or more computing devices (e.g., general purpose computers, special purpose computing devices, servers, etc.) configured via software to implement the various functions and functional components described here. Some computing devices of the system 100 may be remote from others.

In some embodiments, a server computing system that has components including a CPU, I/O components, storage, and memory may be used to execute the content management system 100 or specific components of the content management system 100. The executable code modules of the content management system 100 can be stored in the memory of the server and/or on other types of non-transitory computer-readable storage media. In some embodiments, the content management system 100 may be configured differently than described above.

In some embodiments, the communication medium 150 comprises a network, which may include multiple networking devices (not shown) such as, e.g., switches, edge routers, core routers, etc. The network may, but need not, be a different network than the network 110. In some embodiments, the communication medium 150 comprises a computer bus, for example, where two or more components are located on the same computing device.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A method for managing digital content licenses, the method comprising:
   by a content management system comprising computing hardware:
      storing data representing digital content item licenses from a plurality of content licensors, wherein the digital content item licenses authorize creation of digital content items associated with respective digital content item licenses, said digital content item licenses including a first digital content item license that corresponds to one or more of (a) a particular brand, or (b) a particular character;

providing information regarding a multi-licensor license bundle to a plurality of application developers, said multi-licensor license bundle including the first digital content license and at least one additional digital content item license;

receiving digital content items from an application developer, including at least one digital content item that includes data representing one or more of the particular brand or the particular character, the digital content items configured for use within at least one application;

monitoring compliance of the application developer with the multi-licensor bundle based on the received digital content items; and providing the digital content items for purchase via an electronic catalog based at least partly on a determination of whether the received digital content items are authorized by the multi-licensor license bundle.

2. The method of claim 1, further comprising:
dividing payments received from purchases of the digital content items between at least the application developer and content licensors.

3. The method of claim 1, wherein monitoring compliance of the application developer comprises determining whether a total number of digital content items associated with the first digital content item license exceeds a maximum number of content items authorized by the first digital content item license.

4. The method of claim 3, further comprising:
rejecting a digital content item submission to the electronic catalog in response to determining that the total number of digital content items associated with the first digital content item license exceeds the maximum number.

5. The method of claim 3, further comprising:
generating a report indicating that the maximum number of authorized content items has been exceeded in response to determining that the total number of digital content items associated with the first digital content item license exceeds the maximum number.

6. The method of claim 1, wherein the digital content items comprise game characters.

7. The method of claim 1, wherein at least one of the digital content items includes a representation of said brand.

8. The method of claim 1, wherein the multi-licensor license bundle corresponds to a plurality of game characters and provides bundled rights for incorporating the game characters into at least one game application.

9. The method of claim 1, further comprising providing a software module for inclusion into applications developed by the plurality of developers, the software module configured to track content items used within the applications and to provide data that allows the content management system to track compliance with license bundles associated with the applications.

10. The method of claim 9, further comprising, by the content management system:
receiving data from instances of the software module;
determining, based on the received data, a total number of digital content items associated with a first content license; and
determining whether the total number of digital content items associated with the first content license exceeds a maximum number of content items authorized by the first content license.

11. Non-transitory physical computer storage having stored thereon instructions that, when executed by a computing system, cause the computing system to perform operations comprising:
storing data representing digital content item licenses from a plurality of content licensors, wherein the digital content item licenses authorize creation of digital content items associated with respective digital content licenses, said digital content item licenses including a first digital content item license that corresponds to one or more of (a) a particular brand, or (b) a particular character;

storing data representing a multi-licensor bundle of the digital content item licenses, said bundle including the first digital content item license, and comprising digital content item licenses from more than one of the plurality of content licensors;

storing data identifying an application developer as a licensee under the multi-licensor license bundle;

receiving digital content items from the application developer, including at least one digital content item that includes data representing one or more of the particular brand or the particular character, the digital content items configured for use within applications;

monitoring compliance of the application developer with the multi-licensor license bundle based on the received digital content items; and providing the digital content items for purchase based at least partly on a determination of whether the received digital content items are authorized by the multi-licensor license bundle.

12. The non-transitory computer storage of claim 11, wherein at least one of the digital content items is configured to incorporate the particular character into a game application.

13. The non-transitory computer storage of claim 11, wherein the instructions cause the computing system to:
in response to receiving a purchase payment for a received digital content item access an account associated with the developer and credit at least a portion of the payment to the account.

14. The non-transitory computer storage of claim 13, wherein the instructions cause the computing system to:
in response to receiving the purchase payment:
determine a content licensor associated with the payment; and
credit an account associated with the content licensor with at least a portion of the payment.

15. A system for managing digital content licenses, the system comprising:
a content management system comprising computer hardware, the content management system associated with a plurality of developers and content licensors having user accounts with the content management system, the content management system configured to:
store data representing digital content item licenses from a plurality of content licensors, wherein the digital item content licenses authorize creation of digital content items associated with respective digital content licenses, said digital content item licenses including a first digital content item license that corresponds to one or more of (a) a particular brand, or (b) a particular character;
store data representing a multi-licensor license bundle comprising digital content item licenses from more than one of the plurality of content licensors, said bundle including the first digital content item license;

store data associating a developer with the multi-licensor license bundle;

receive from the developer digital content items authorized by the license bundle, including a digital content item configured to incorporate into an application one or more of the particular brand or the particular character; and make the authorized digital content items available for electronic purchase.

16. The system of claim 15, wherein the content management system is configured to:

in response to receiving a purchase request for the license bundle from the developer, associate the license bundle with an account of the developer; and monitor a total number of digital content items generated under the license bundle by the developer.

17. The system of claim 16, wherein the content management system is configured to:

in response to determining that the total number of digital content items generated under the license bundle exceeds a maximum threshold specified by the license bundle, transmit a content license violation notice to the content licensors associated with the license bundle.

18. The system of claim 16, wherein the content management system is configured to:

reject a digital content item submission in response to determining that the total number of digital content items generated under the license bundle exceeds a maximum threshold specified by the license bundle.

* * * * *